(12) United States Patent
Kubiak et al.

(10) Patent No.: US 9,234,807 B2
(45) Date of Patent: Jan. 12, 2016

(54) MEASURING PROBE HAVING A HOUSING

(75) Inventors: Michael Kubiak, Berlin (DE);
Wolfgang Grundmann, Birkenwerder (DE)

(73) Assignee: EPCOS AG, Munich (DE)

( * ) Notice: Subject to any disclaimer, the term of this patent is extended or adjusted under 35 U.S.C. 154(b) by 275 days.

(21) Appl. No.: 13/635,283

(22) PCT Filed: Mar. 22, 2011

(86) PCT No.: PCT/EP2011/054369
§ 371 (c)(1),
(2), (4) Date: Nov. 27, 2012

(87) PCT Pub. No.: WO2011/124468
PCT Pub. Date: Oct. 13, 2011

(65) Prior Publication Data
US 2013/0070806 A1    Mar. 21, 2013

(30) Foreign Application Priority Data

Mar. 30, 2010 (DE) .......................... 10 2010 013 321

(51) Int. Cl.
*G01K 1/00* (2006.01)
*G01K 13/00* (2006.01)
*G01K 13/02* (2006.01)

(52) U.S. Cl.
CPC ..................................... *G01K 13/02* (2013.01)

(58) Field of Classification Search
USPC .................. 374/138, 148, 135, 208
See application file for complete search history.

(56) References Cited

U.S. PATENT DOCUMENTS

| | | | |
|---|---|---|---|
| 1,828,170 A * | 10/1931 | Bristol ...................... 285/139.3 |
| 2,496,806 A | 2/1950 | Moffatt | |
| 4,265,115 A | 5/1981 | Stuhr | |
| 4,548,517 A * | 10/1985 | Kampmann ................... 374/143 |
| 5,342,126 A * | 8/1994 | Heston et al. ................. 374/208 |
| 6,712,507 B2 * | 3/2004 | Park et al. ..................... 374/185 |
| 7,056,013 B2 * | 6/2006 | Anderson et al. ............. 374/138 |
| 7,341,097 B2 * | 3/2008 | Darby .......................... 165/11.1 |
| 7,434,448 B2 | 10/2008 | Weyl et al. | |
| 7,458,718 B2 * | 12/2008 | Krishnamurthy et al. .... 374/208 |
| 7,465,086 B1 * | 12/2008 | Foreman, Jr. ................. 374/143 |
| 7,985,021 B2 * | 7/2011 | Bard et al. .................... 374/138 |
| 2002/0122459 A1* | 9/2002 | McFarland et al. ........... 374/179 |
| 2005/0089082 A1 | 4/2005 | Anderson et al. | |
| 2005/0155408 A1 | 7/2005 | Weyl et al. | |
| 2005/0175066 A1* | 8/2005 | Nakabayashi ................ 374/148 |
| 2007/0056353 A1* | 3/2007 | Weyl et al. .................... 73/23.31 |
| 2008/0205485 A1* | 8/2008 | Takahashi ..................... 374/208 |
| 2009/0207878 A1* | 8/2009 | Bard et al. .................... 374/116 |
| 2010/0176912 A1* | 7/2010 | Sears et al. ................... 338/22 R |
| 2011/0030461 A1 | 2/2011 | Bohl et al. | |

FOREIGN PATENT DOCUMENTS

| | | |
|---|---|---|
| DE | 2 313 549 A1 | 11/1973 |
| DE | 10 2006 021 528 B3 | 9/2007 |
| DE | 103 24 956 B4 | 3/2008 |

(Continued)

OTHER PUBLICATIONS

Translation of DE102010013321 (Mar. 30, 2010).*

*Primary Examiner* — Mirellys Jagan
(74) *Attorney, Agent, or Firm* — Slater & Matsil, L.L.P.

(57) ABSTRACT

A measuring probe has a housing for receiving a sensor element. The measuring probe can be inserted in an opening of a device for carrying a medium. The housing has a curved outer circumference line perpendicular to the insertion direction of the housing in the device.

20 Claims, 2 Drawing Sheets

(56) References Cited

FOREIGN PATENT DOCUMENTS

| DE | 10 2008 029 793 A1 | 10/2009 |
| EP | 1 984 717 B1 | 7/2010 |
| GB | 734702 A | 8/1955 |
| JP | 1183640 A | 3/1999 |
| JP | 2007511752 A | 5/2007 |
| JP | 2008082797 A | 4/2008 |
| WO | WO 03/076920 A1 | 9/2003 |

* cited by examiner

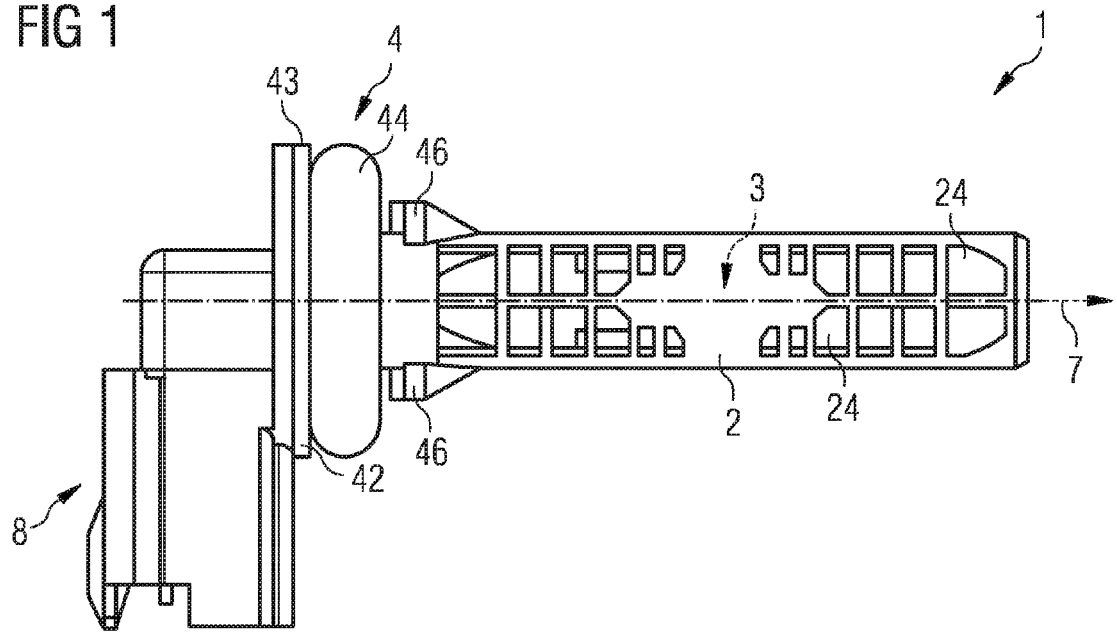
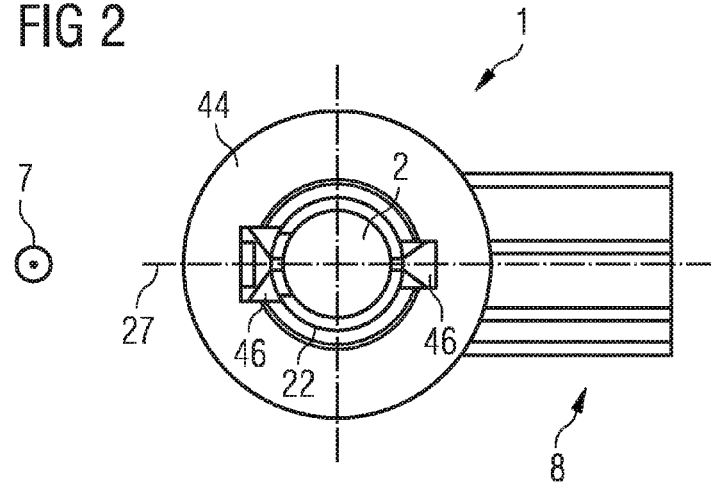

MEASURING PROBE HAVING A HOUSING

This patent application is a national phase filing under section 371 of PCT/EP2011/054369, filed Mar. 22, 2011, which claims the priority of German patent application 10 2010 013 321.3, filed Mar. 30, 2010, each of which is incorporated herein by reference in its entirety.

TECHNICAL FIELD

A measuring probe is specified, which, for example, can be used for measuring the temperature or the humidity of a flowing medium.

BACKGROUND

German Patent document DE 10 2006 021 528 B3 and DE 10 2008 029 793 A1 describe measuring probes for measuring the temperature of an airflow.

SUMMARY OF THE INVENTION

Specifying a measuring probe in which a housing has expedient properties is described herein.

A measuring probe with a housing for holding a sensor element is specified. The measuring probe can be inserted into an opening of a device for routing a medium. The housing of the measuring probe has a curved outer circumferential line perpendicular to the insertion direction of the housing into the device.

By way of example, the measuring probe is used to capture the temperature of a medium, preferably a gaseous or liquid medium. Here, the medium preferably flows through the device, which can be embodied as a duct or pipe piece. The measuring probe is inserted into the device in the insertion direction, with the insertion direction preferably running perpendicular to the flow direction of the medium.

The sensor element is at least partly surrounded by the housing of the measuring probe. In particular, the housing can have shielding elements which prevent the medium from impacting head-on on the sensor element. To this end, the housing can have a region, more particularly a wall region, which is arranged between the medium and the sensor element in the flow direction of the medium, such that a projection of the shielding element covers the sensor element in the flow direction. In particular, this can mean that a shielding element, for example part of a wall of the housing, is arranged between the medium and the sensor element in a direction perpendicular to the insertion direction. By way of example, the sensor element can also be surrounded by the housing on all sides.

The housing is preferably embodied such that the flow property of the medium is changed as little as possible. By way of example, the medium exhibits laminar flow in the device, both prior to the medium arriving at the housing and also thereafter. What the curved outer circumferential line preferably achieves is that the flow property of the medium is changed as little as possible.

In one embodiment, the housing has at least one inlet opening for routing the medium into the interior of the housing. If the housing has at least one shielding element, this can more particularly mean that a projection of the at least one inlet opening does not cover the sensor element in the flow direction such that the medium cannot flow directly onto the sensor element. By way of example, the housing can have a plurality of openings which at least partly surround a shielding element.

The housing is preferably embodied such that the medium is directed to the sensor element after entry into the housing. To this end, deflection means are for example provided. By way of example, a deflection means can be formed by a cone-like housing part which is arranged collinearly with the sensor element in the insertion direction and the tip of which points at the sensor element. Here, the tip can also be rounded. Furthermore, the cone-like housing part can have a lateral face, which is straight, curved or bent in a plane parallel to the insertion direction. In particular, the deflection means can also render it possible to direct the medium to the sensor element if there is an above-described shielding element that prevents a direct flow onto the sensor element. Furthermore, the at least one deflection means can for example direct the medium, which flows onto the housing over at least part of the whole length thereof or over the whole length thereof in the device, onto the sensor element, as a result of which an integral measurement is possible. As a result of this, there can be a direct measurement of the relevant parameters of the medium, as a result of which quick capture of variations in a parameter is made possible. Moreover, the housing can also have means for focusing the airflow such that the sensor element can capture average values of the parameters. By way of example, a means for focusing can also be embodied as deflection means at the same time.

The housing moreover preferably has at least one outlet opening through which the medium can leave the housing again. Consequently at least some of the medium passes through the housing.

The outer circumferential line of the housing can for example be interrupted by the inlet and outlet openings. The statement that the housing is "substantially curved" should also comprise such partial interruptions of the curved circumferential line. The circumferential line preferably has a curved embodiment at least in one region of the housing that is not interrupted by the inlet or outlet openings.

By way of example, inlet openings are provided on the side of the housing onto which the medium flows head on and outlet openings are provided on the opposite side thereto. In this case the housing preferably has a curved surface on those sides at which the medium flows past the housing.

In one embodiment, the outer circumferential line of the housing has a substantially elliptic design. By way of example, an elliptic circumferential line has a major axis which is longer than the minor axis.

Here, the housing can have a symmetric design in respect of a plane in which the insertion direction runs. As a result of such a symmetric design of the housing, the measuring probe can be inserted in two different rotational orientations around the insertion direction. The measuring probe can then, in the case of an elliptic shape of the outer circumferential line, for example be inserted into the device in two possible insertion orientations such that the major axis runs parallel to the flow direction of the medium.

In a preferred embodiment, the housing has an outer circumferential line which is substantially circular.

The housing preferably has a rotationally symmetric shape around the insertion direction. In this case, the measuring probe can be inserted into the device with any rotational orientation in the insertion direction. This allows a particularly uncomplicated insertion process.

In one embodiment, one or more inlet openings are embodied such that the medium can be directed into the interior of the housing in the case of any rotational orientation of the measuring probe around the insertion direction.

In this case, the outlet openings are preferably also embodied accordingly. This affords the possibility of the measuring probe being able to capture measurement data reliably at any rotational orientation around the insertion direction.

Furthermore, the measuring probe can have a holder for mechanically connecting the measuring probe to the device. The holder is preferably arranged at the housing and can, in the process, also form an integral component of the housing.

The holder preferably has a stop which runs perpendicular to the insertion direction.

The stop can prevent the measuring probe from being inserted too far into the opening.

The stop preferably has a curved outer circumferential line perpendicular to the insertion direction of the housing. By way of example, the circumferential line has an elliptic or circular embodiment.

An annular seal can be arranged at the stop. The seal preferably serves for sealing an opening of a device, into which the measuring probe is inserted.

The seal is, for example, pushed onto the housing. The seal preferably completely surrounds the housing, at least in a plane perpendicular to the insertion direction. Here, the seal bears against the housing in an interlocking fashion, preferably circumferentially. The housing preferably has a curved outer circumferential line, at least in the region in which the seal is provided. In this case, the interlock between the seal and the housing can be achieved particularly well. Moreover, the mechanical load on the seal can be kept low in the case of a housing that has a curved bearing face, i.e., the face on which the seal bears against the housing. In particular, it is advantageous if the bearing face does not have any edges or corners.

Furthermore, a measuring probe arrangement with such a measuring probe and a device for routing a medium is specified. The device has an opening for inserting the measuring probe. The shape of the opening preferably is complementary to the outer circumferential line of the housing.

BRIEF DESCRIPTION OF THE DRAWINGS

In the following text, the specified subject matter and advantageous embodiments thereof will be explained on the basis of figures which are schematic and not to scale. In detail:

FIG. 1 shows a lateral plan view of a measuring probe having a housing;

FIG. 2 shows a plan view of the measuring probe from FIG. 1, as seen against the insertion direction.

DETAILED DESCRIPTION OF ILLUSTRATIVE EMBODIMENTS

Figure 3:
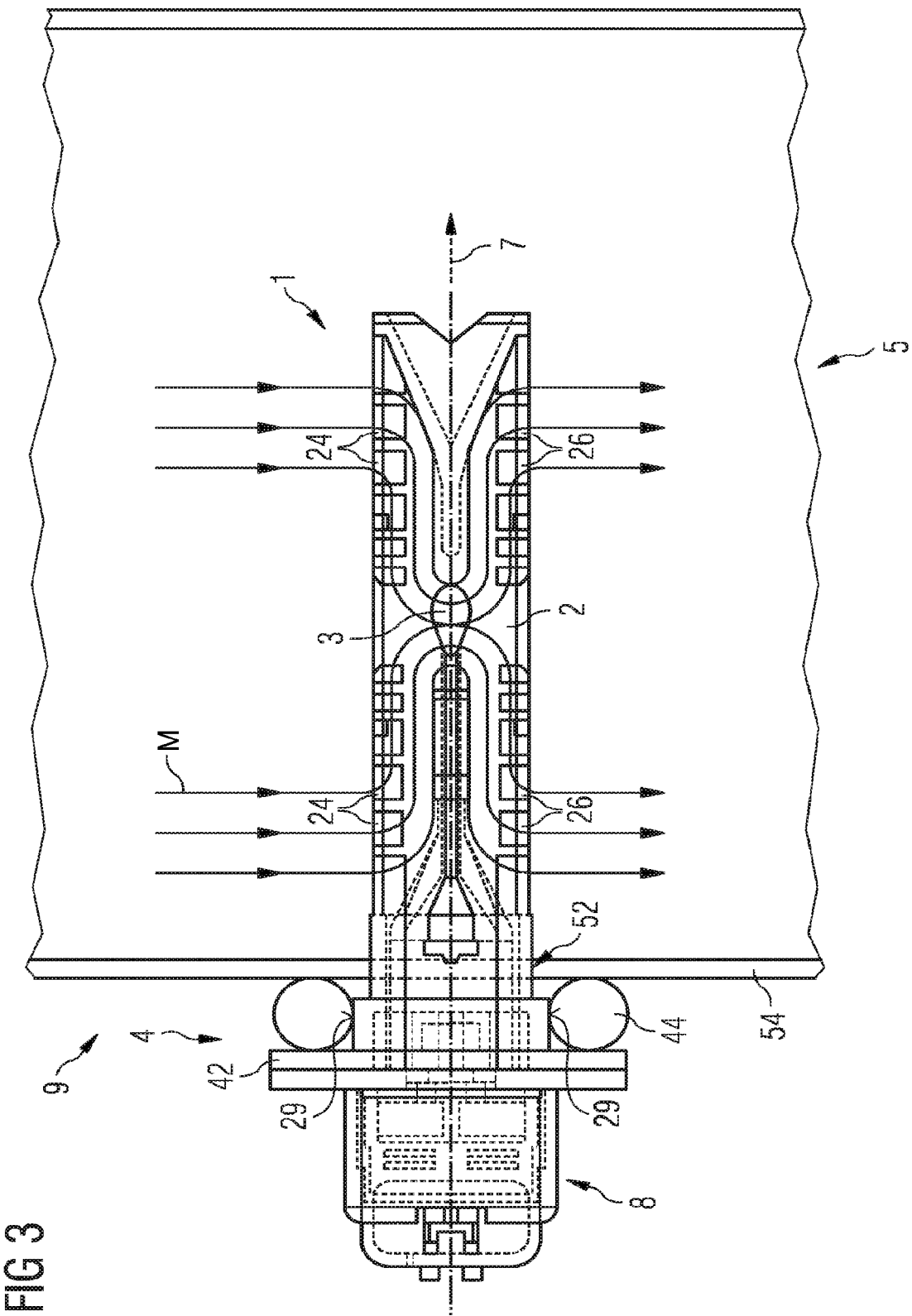
FIG. 3 shows a longitudinal section of a measuring probe which is inserted into an opening of a device.

FIG. 1 shows a measuring probe 1 which is used, for example, for capturing the temperature or the humidity of a medium. The measuring probe 1 preferably serves for capturing measurement values of a flowing medium, for example an airflow, and can, for this purpose, be inserted into a device in which the medium is routed.

The measuring probe 1 has a housing 2 in which a sensor element 3 is arranged. The housing 2 surrounds the sensor element 3 at least in part and can serve both to hold the sensor element 3 and to shield the sensor element 3 from the medium flowing directly thereon. The sensor element 3 cannot be seen in FIG. 1 because it is covered by the housing 2.

The measuring probe 1 can be inserted into the opening of a device along an insertion direction 7. The insertion direction 7 corresponds to the longitudinal axis of the measuring probe 1. The measuring probe 1 has a holder 4 for attaching it to the device. When inserted into an opening of the device, the measuring probe 1 is, with its housing 2, pushed into the opening in the insertion direction until the holder 4 butts against an outer wall of the device. A latch 46 is provided for affixing the measuring probe 1 on the device by latching into an inner wall of the device during insertion.

The holder 4 has a stop 42 on which a sealing ring 44 bears. In the case of an inserted measuring probe 1, the sealing ring 44 bears against the outer wall of the device and seals the opening to the outside.

In order to establish an electric connection of the sensor element 3, the measuring probe 1 has a connector part 8. The connector part 8 is situated outside of the device in the inserted state. By way of example, the connector part 8 is embodied as a plug into which a further contact can be inserted.

The housing 2 has a plurality of inlet openings 24 through which the medium can reach the sensor element 3. These inlet openings 24 can also serve as outlet openings for the medium, depending on the insertion orientation of the measuring probe 1, i.e., depending on rotational orientation of the measuring probe 1 around the insertion direction 7. The measuring probe 1 preferably also has inlet or outlet openings 24 on the side that is opposite to the imaged side. Hence, the medium can flow through the measuring probe 1 and can reach the sensor element 3 in the process.

The inlet openings 24 are, at least in part, arranged around a shielding element which is formed by part of the housing 2 or of the housing wall in that region which covers the sensor element 3 in the projection along the flow direction. Thus, in FIG. 1, the part of the housing 2 which covers the sensor element 3 forms a shielding element which prevents direct flow of the medium onto the sensor element 3. Except for in the region of the shielding element, the inlet openings 24 are arranged along the insertion direction 7 over the entire length of the housing 2 within the device and are arranged symmetrically throughout the sensor element 3 with respect to a plane perpendicular to the insertion direction 7. In particular, the housing 2 has a multiplicity of inlet openings 24, which are arranged symmetrically throughout the sensor element 2 with respect to a plane perpendicular to the insertion direction 7. As explained in conjunction with FIG. 3, the medium in the device can thus flow into the interior of the housing 2 and to the sensor element 3 over almost the whole length of the housing 2 within the device, as a result of which an integral measurement of parameters of the medium to be measured is possible along the housing 2.

FIG. 2 shows a plan view of the measuring probe 1, as seen against the insertion direction 7.

The housing 2 has a circular outer circumferential line 22 in a plane perpendicular to the insertion direction 7. Here, the outer circumferential line 22 is interrupted by inlet openings or outlet openings. The housing 2 preferably has a circular circumferential line, at least level with its longitudinal axis on which the sensor element 3 is situated.

An expedient flow path of the medium can be achieved by the circular circumferential line 22. The measuring probe 1 preferably leads to a disturbance in the flow of the medium which is as small as possible.

The stop 42 also has a substantially circular outer circumferential line 43 (see FIG. 1). The sealing ring 44 is embodied as circular ring and bears against the housing 2 in interlocking fashion.

Apart from the latch 46, the housing 2 is embodied symmetrically with respect to a plane 27 in which the longitudinal axis of the measuring probe 1 runs and which, in the inserted state of the measuring probe 1, for example extends perpendicular to the flow direction of the medium. In the embodiment illustrated here, the latch 46 are embodied such that, for example in combination with additional webs arranged at the point of installation, they can uniquely fix the rotational orientation of the measuring probe 1 in the device. Hence the measuring probe 1 can only be inserted with one rotational orientation at the point of installation.

In another embodiment, the latch 46 and the point of installation can be embodied such that various rotational orientations of the measuring probe 1 are possible. By way of example, the latch 46 can be embodied symmetrically with respect to the plane 27 in which the longitudinal axis of the measuring probe 1 runs and which, in the inserted state of the measuring probe 1, extends perpendicular to the flow direction of the medium. In this case the measuring probe 1 can for example be inserted into a device with two different rotational orientations around the insertion direction 7.

FIG. 3 shows a measuring probe arrangement 9 with a measuring probe 1, which can for example be embodied as in FIGS. 1 and 2, and with a device 5 which has an opening 52 into which the measuring probe 1 is inserted. The device 5 is embodied as a tube with an outer wall 54, in which tube a medium M flows.

The insertion direction 7 of the measuring probe 1 runs perpendicular to the flow direction of the medium M. The medium M flows into the interior of the housing 2 through inlet openings 24, is directed onto the sensor element 3 and re-emerges from the housing 2 through outlet openings 26.

In order to deflect the medium M which, as explained in conjunction with FIG. 1, can enter the housing 2 over almost the whole length of the housing 2 within the device, the housing 2 has two cone-like housing parts in the interior thereof, which cone-like housing parts are arranged collinearly with the sensor element 3 in the insertion direction 7 and respectively have a tip which points at the sensor element 3. Here, the sensor element 3 is attached to the housing by the plug-side cone-like housing part.

The cone-like housing parts furthermore respectively have a lateral face onto which the medium M flows through the inlet openings 24 and which is kinked or bent in a plane parallel to the insertion direction 7, i.e., more particularly in the shown plane of the drawing. As a result of this, the medium M can be directed at the sensor element 3, which is shielded against a direct flow thereon by the shielding element described in conjunction with FIG. 1.

Additionally, the cone-like housing parts also act as means for focusing the medium M such that the sensor element 3 can capture average values of the parameters of the medium M to be measured along almost the whole length of the housing 2 within the device despite the small dimensions thereof compared to the housing 2.

The measuring probe 1 is embodied such that it can also be inserted into the opening 52 with an orientation which, compared to the orientation shown, is rotated by 180° around the insertion direction 7.

The sealing ring 44 bears against the outer wall 54 of the device 5 and against the housing 2 in interlocking fashion. As a result of the circular circumferential line of the housing 2, particularly on the bearing face 29 of the sealing ring 44, the sealing ring 44 bears against the housing in interlocking fashion around the circumference and enables particularly good sealing of the device 5.

The invention claimed is:

1. A measuring probe that can be inserted into device opening of a device for routing a flowing medium, the measuring probe comprising:
    a sensor element; and
    a housing holding the sensor element, wherein the housing has a curved outer circumferential line perpendicular to an insertion direction of the housing into the device;
    wherein the housing comprises a latch configured to latch the measuring probe to the device in different optional rotational orientations around the insertion direction;
    wherein the housing has a first group of openings and a second group of openings arranged in the housing for the medium to enter and leave the housing;
    wherein the first group of openings is separated from the second group of openings by a first shielding element located on a first side of the housing and by a second shielding element located on a second side of the housing opposite the first side of the housing;
    wherein the first and second shielding elements are formed as contiguous parts of the housing, extend along the insertion direction and are arranged to partially block the medium from entering the housing from the first side and second side of the housing;
    wherein the openings of the first and second group of openings extend along the curved outer circumferential line of the housing perpendicular to the insertion direction such that the medium is partially enabled to enter the housing from at least one of the first side and second side of the housing.

2. The measuring probe according to claim 1, wherein the outer circumferential line of the housing is substantially elliptical.

3. The measuring probe according to claim 1, wherein the outer circumferential line of the housing is substantially circular.

4. The measuring probe according to claim 1, wherein the housing has a rotationally symmetric shape around the insertion direction.

5. The measuring probe according to claim 1, wherein the openings of at least one of the first group of openings and the second group of openings comprise at least one inlet opening for routing the medium into an interior of the housing.

6. The measuring probe according to claim 5, wherein the inlet opening is embodied such that the medium can be routed into the interior of the housing at any rotational orientation of the measuring probe around the insertion direction.

7. The measuring probe according to claim 1, further comprising a holder for mechanically connecting the measuring probe to the device.

8. The measuring probe according to claim 7, wherein the holder is arranged at the housing and has a stop which runs perpendicular to the insertion direction.

9. The measuring probe according to claim 8, wherein the stop has a circular circumferential line.

10. The measuring probe according to claim 8, in which an annular seal is arranged at the stop.

11. An apparatus comprising:
    a device for routing a medium, the device having a device opening; and
    a measuring probe that can be inserted into the device opening of the device, the measuring probe comprising a sensor element, a housing holding the sensor element and comprising a latch, wherein the housing has a curved outer circumferential line perpendicular to an insertion direction of the housing into the device;

wherein the latch is configured to latch the measuring probe to the device in the opening and wherein the latch is further configured permit the measuring probe to move on two predefined and different rotational orientations around the insertion direction within the opening; and wherein the device opening has a shape that is complementary to the outer circumferential line of the housing;

wherein the housing has a first group of openings and a second group of openings arranged in the housing for a medium flowing through the device to enter and leave the housing;

wherein the first group of openings is separated from the second group of openings by a first shielding element located on a first side of the housing and by a second shielding element located on a second side of the housing opposite the first side of the housing;

wherein the first and second shielding elements are formed as contiguous parts of the housing, extend along the insertion direction and are arranged to partially block the medium from entering the housing from the first side and second side of the housing; and wherein the openings of the first and second group of openings extend along the curved outer circumferential line of the housing perpendicular to the insertion direction such that the medium is partially enabled to enter the housing from at least one of the first side and second side of the housing.

12. The apparatus according to claim 11, wherein the device comprises a tube with an outer wall, the opening within the outer wall.

13. A method of measuring a medium, the method comprising:

flowing the medium through a device;

inserting a measuring probe into device opening of the device, the measuring probe comprising a sensor element, a housing holding the sensor element and comprising a latch, wherein the housing has a curved outer circumferential line perpendicular to an insertion direction of the housing into the device, wherein the opening has a shape that is complementary to the outer circumferential line of the housing, wherein the latch is configured to latch the measuring probe to the device in the opening and wherein the latch is further configured permit the measuring probe to move on two predefined different rotational orientations around the insertion direction within the opening; and measuring a characteristic of the medium with the measuring probe;

wherein the housing has a first group of openings and a second group of openings arranged in the housing for the medium to enter and leave the housing;

wherein the first group of openings is separated from the second group of openings by a first shielding element located on a first side of the housing and by a second shielding element located on a second side of the housing opposite the first side of the housing;

wherein the first and second shielding elements are formed as contiguous parts of the housing, extend along the insertion direction and are arranged to partially block the medium from entering the housing from the first side and second side of the housing; and wherein the openings of the first and second group of openings extend along the curved outer circumferential line of the housing perpendicular to the insertion direction such that the medium is partially enabled to enter the housing from at least one of the first side and second side of the housing.

14. The method according to claim 13, wherein, during the measuring, the medium flows into an interior of the housing and is directed onto the sensor element.

15. The method according to claim 14, wherein the medium flows into the house through inlet openings and flows out of the housing through outlet openings.

16. The method according to claim 14, wherein the medium flows into the interior of the housing through a majority of a length of the housing within the device.

17. The method according to claim 14, wherein the medium is shielded against a direct flow of the medium when the medium is directed onto the sensor element.

18. The method according to claim 14, wherein the medium is directed onto the sensor element by cone-like housing parts that are arranged in the interior of the housing.

19. The method according to claim 18, wherein the cone-like housing parts are arranged collinearly with the sensor element in the insertion direction, each cone-like element having a tip that points at the sensor element.

20. The method according to claim 18, wherein the cone-like housing parts focus the medium such that the sensor element can capture average values of the characteristics of the medium.

* * * * *